US012564937B2

(12) United States Patent　　(10) Patent No.:　US 12,564,937 B2
Matsuno et al.　　　　　　　　　　(45) Date of Patent:　　Mar. 3, 2026

(54) MOBILE SYSTEM

(71) Applicant: TOYOTA JIDOSHA KABUSHIKI KAISHA, Aichi-ken (JP)

(72) Inventors: Nobuyuki Matsuno, Tokyo-to (JP); Hirotaka Komura, Tokyo-to (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 224 days.

(21) Appl. No.: 18/508,229

(22) Filed: Nov. 14, 2023

(65) Prior Publication Data

US 2024/0217090 A1　　Jul. 4, 2024

(30) Foreign Application Priority Data

Dec. 28, 2022　(JP) .................................. 2022-211294

(51) Int. Cl.
　　*B25J 5/00*　　　　(2006.01)
　　*B25J 19/02*　　　(2006.01)
(52) U.S. Cl.
　　CPC ............. *B25J 5/007* (2013.01); *B25J 19/021* (2013.01)
(58) Field of Classification Search
　　None
　　See application file for complete search history.

(56) References Cited

U.S. PATENT DOCUMENTS

2005/0237388 A1　10/2005　Tani
2008/0012310 A1 *　1/2008　Weaver ................... F16L 55/32
　　　　　　　　　　　　　　　　　　　285/288.1

2010/0234993 A1 *　9/2010　Seelinger ............... B25J 9/1697
　　　　　　　　　　　　　　　　　　　700/254
2017/0028550 A1 *　2/2017　Terada ..................... B25J 9/162
2018/0215040 A1 *　8/2018　Asahara ................. B25J 9/1694
2019/0160682 A1 *　5/2019　Sato ......................... B25J 9/162
2021/0409647 A1　12/2021　Yang
2022/0250250 A1 *　8/2022　Oda ...................... B25J 9/1697

FOREIGN PATENT DOCUMENTS

JP　　　2005-304540 A　　11/2005
JP　　　2016-104512 A　　　6/2016
JP　　　2016-218736 A　　12/2016
JP　　　2021-523496 A　　　9/2021

* cited by examiner

*Primary Examiner* — Nhi Q Bui
(74) *Attorney, Agent, or Firm* — HAUPTMAN HAM, LLP

(57)　　　　　　　ABSTRACT

A mobile system including: a mobile robot; a first camera installed in a first predetermined area, the first predetermined area being an area at an upper side and a front side of a side surface area of a housing of the mobile robot; and a second camera installed in a second predetermined area, the second predetermined area being an area at a lower side and a rear side of the side surface area, in which the first camera is installed so that one of side surfaces of a quadrangular pyramid-shaped field-of-view range having a viewpoint of the first camera as an apex comes into contact with the side surface, and the second camera is installed so that one of side surfaces of a quadrangular pyramid-shaped field-of-view range having a viewpoint of the second camera as an apex comes into contact with the side surface.

7 Claims, 8 Drawing Sheets

LONGITUDINAL
DIRECTION

MOBILE SYSTEM

CROSS REFERENCE TO RELATED APPLICATIONS

This application is based upon and claims the benefit of priority from Japanese patent application No. 2022-211294, filed on Dec. 28, 2022, the disclosure of which is incorporated herein in its entirety by reference.

BACKGROUND

The present disclosure relates to a mobile system.

In recent years, there has been a demand that an environment in the vicinity of a mobile robot be efficiently observed. The related art is disclosed, for example, in Japanese Unexamined Patent Application Publication No. 2016-104512.

Japanese Unexamined Patent Application Publication No. 2016-104512 discloses a control apparatus that remotely controls a mobile body including at least an imaging unit and a drive unit for moving a position of the mobile body. The control apparatus includes a generation unit that generates search range specifying information used to, in response to designation of a search range for making the mobile body autonomously search for a predetermined object, specify the search range, and a control unit that controls the drive unit and an angle of view of the imaging unit so that the mobile body searches for the predetermined object within the search range using the search range specifying information.

SUMMARY

In addition to the method disclosed in Japanese Unexamined Patent Application Publication No. 2016-104512, there still has been a demand for other methods by which an environment in the vicinity of a mobile robot can be efficiently observed.

The present disclosure has been made in view of the aforementioned circumstances and an object thereof is to provide a mobile system capable of efficiently observing an environment in the vicinity of a mobile robot by using a small number of cameras.

A mobile system according to the present disclosure includes: a mobile robot; a first camera installed in a first predetermined area, the first predetermined area being an area at an upper side and one of a front side and a rear side of a side surface area of a housing of the mobile robot; and a second camera installed in a second predetermined area, the second predetermined area being an area at a lower side and the other of the front side and the rear side of the side surface area of the housing of the mobile robot, in which the first camera is installed so as to face downward from the first predetermined area so that one of side surfaces of a quadrangular pyramid-shaped field-of-view range having a viewpoint of the first camera as an apex substantially comes into contact with the side surface of the housing of the mobile robot, and the second camera is installed so as to face upward from the second predetermined area so that one of side surfaces of a quadrangular pyramid-shaped field-of-view range having a viewpoint of the second camera as an apex substantially comes into contact with the side surface of the housing of the mobile robot. By this configuration, the mobile system can efficiently observe an environment in the vicinity of a mobile robot by using a small number of cameras.

The housing of the mobile robot may have a rectangular parallelepiped shape, the first predetermined area may be an area at an upper corner and one of a front corner and a rear corner of the side surface area of the housing of the mobile robot, and the second predetermined area may be an area at a lower corner and the other of the front corner and the rear corner of the side surface area of the housing of the mobile robot.

The housing of the mobile robot may have a rectangular parallelepiped shape in which the corners thereof are rounded, the first predetermined area may be an area at an upper corner and one of a front corner and a rear corner of the side surface area of the housing of the mobile robot, and the second predetermined area may be an area at a lower corner and the other of the front corner and the rear corner of the side surface area of the housing of the mobile robot.

The first predetermined area may be an area at an upper side and a front side of the side surface area of the housing of the mobile robot, the second predetermined area may be an area at a lower side and a rear side of the side surface area of the housing of the mobile robot, and when, in the side surface area of the housing of the mobile robot included in a zx plane where a vertically upward direction is a positive direction of a z axis, and a front of the mobile robot is a positive direction of an x axis, coordinates of an arbitrary position are set to $(z',x')$, coordinates where a viewpoint of the first camera is located are set to $(z\_u,x\_u)$, and coordinates where a viewpoint of the second camera is located are set to $(z\_d,x\_d)$, the first camera may be installed so as to satisfy a condition that there are no coordinates $(z',x')$ that satisfy $z'>z\_u$ and $x'>x\_u$, and the second camera may be installed so as to satisfy a condition that there are no coordinates $(z',x')$ that satisfy $z'<z\_d$ and $x'<x\_d$.

The first predetermined area may be an area at an upper side and a rear side of the side surface area of the housing of the mobile robot, the second predetermined area may be an area at a lower side and a front side of the side surface area of the housing of the mobile robot, and when, in the side surface area of the housing of the mobile robot included in a zx plane where a vertically upward direction is a positive direction of a z axis, and a front of the mobile robot is a positive direction of an x axis, coordinates of an arbitrary position are set to $(z',x')$, coordinates where a viewpoint of the first camera is located are set to $(z\_u,x\_u)$, and coordinates where a viewpoint of the second camera is located are set to $(z\_d,x\_d)$, the first camera may be installed so as to satisfy a condition that there are no coordinates $(z',x')$ that satisfy $z'>z\_u$ and $x'<x\_u$, and the second camera may be installed so as to satisfy a condition that there are no coordinates $(z',x')$ that satisfy $z'<z\_d$ and $x'>x\_d$.

The first camera may have a shape in which it is extended in a left-right direction, and be installed so that a longitudinal direction thereof is parallel to the side surface of the housing of the mobile robot, and the second camera may have a shape in which it is extended in the left-right direction, and be installed so that a longitudinal direction thereof is parallel to the side surface of the housing of the mobile robot.

Both the first camera and the second camera may be depth cameras.

According to the present disclosure, it is possible to provide a mobile system capable of efficiently observing an environment in the vicinity of a mobile robot by using a small number of cameras.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Figure 1:
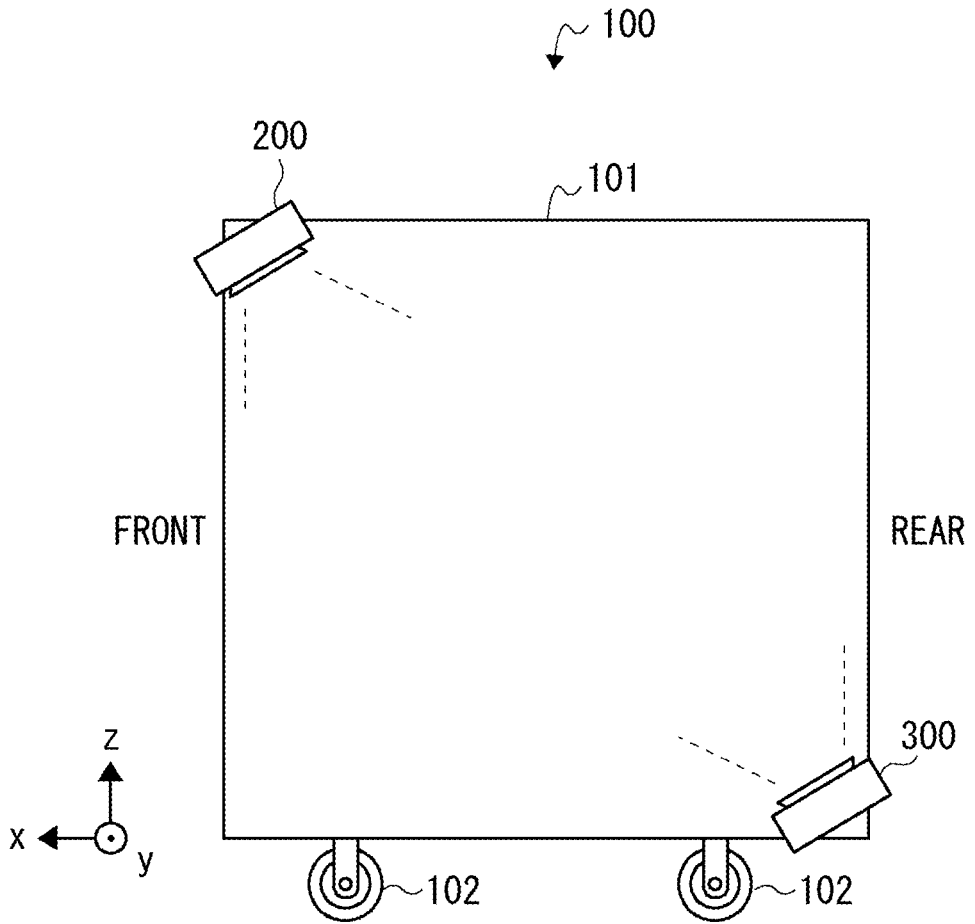
FIG. 1 is a schematic side view showing an example of a configuration of a mobile system according to a first embodiment.

The present disclosure will be described hereinafter with reference to an embodiment of the present disclosure. However, the following embodiment is not intended to limit the scope of the disclosure according to the claims. Further, all the components/structures described in the embodiment are not necessarily essential as means for solving the problem. For the clarification of the description, the following descriptions and the drawings are partially omitted and simplified as appropriate. The same elements are denoted by the same reference numerals or symbols throughout the drawings, and redundant descriptions are omitted as necessary.

First Embodiment

FIG. 1 is a schematic side view showing an example of a configuration of a mobile system according to a first embodiment. By arranging the positions where cameras are attached to a mobile robot in a particular manner, the mobile system according to this embodiment can efficiently observe an environment in the vicinity of the mobile robot by using a small number of cameras. The details of the above configuration will be described below.

As shown in FIG. 1, the mobile system according to this embodiment includes at least a mobile robot 100, a camera (a first camera) 200, and a camera (a second camera) 300. Note that the mobile robot 100 and the cameras 200 and 300 may be collectively referred to as a mobile robot.

The mobile robot 100 is, for example, a robot configured to move autonomously. However, the mobile robot 100 may be a robot configured to move by user operations. The mobile robot 100 includes, for example, a rectangular parallelepiped housing 101 and a plurality of wheels 102 provided on a lower side of the housing 101. Further, a control apparatus (not shown) is provided inside the housing 101. The control apparatus, for example, knows position information of the mobile robot 100 and an environment in the vicinity of the mobile robot 100 from images captured by the cameras 200 and 300 and rotates the plurality of wheels 102, thereby controlling the traveling of the mobile robot 100.

The cameras 200 and 300 are installed on each side surface of the housing 101 of the mobile robot 100. Since the positions where the cameras 200 and 300 are installed on one side surface of the housing 101 and the positions where the cameras 200 and 300 are installed on the other side surface of the housing 101 are basically the same, the positions where the cameras 200 and 300 are installed on one side surface area of the housing 101 (hereinafter referred to simply as a side surface of the housing 101) will be described below.

Figure 2:
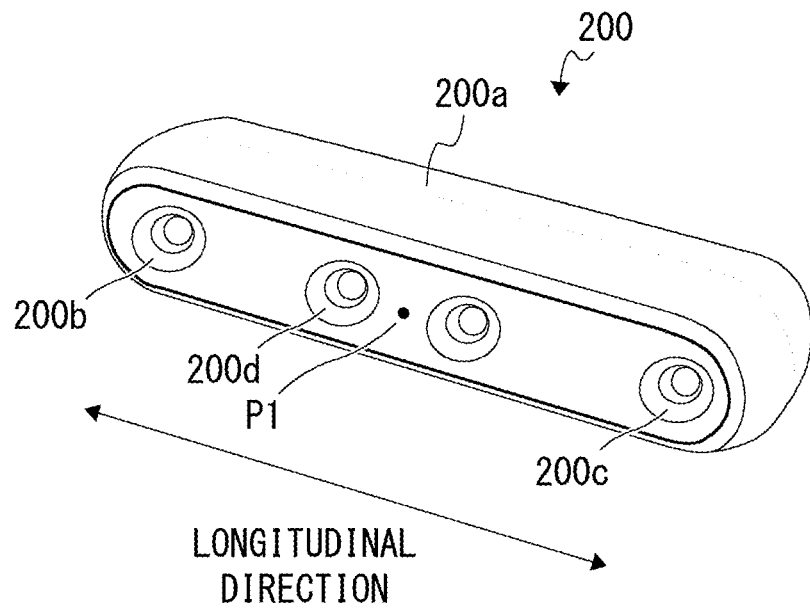
FIG. 2 is a diagram showing an example of a first camera provided in the mobile system according to the first embodiment.

FIG. 2 is a diagram showing an example of the camera 200. Since the structure of the camera 300 is similar to that of the camera 200, the descriptions thereof will be omitted. As shown in FIG. 2, the camera 200 is, for example, a depth camera, such as a TOF camera, and includes a housing 200$a$ having a shape in which it is extended in the left-right direction (a capsule-like shape in the example of FIG. 2), and depth sensors 200$b$ and 200$c$ and an RGB sensor 200$d$ installed along the longitudinal direction of the housing 200$a$. By using the depth sensors 200$b$ and 200$c$, the camera 300 can acquire information about the depth (depth dimension) of an object present near the mobile robot 100.

Figure 3:
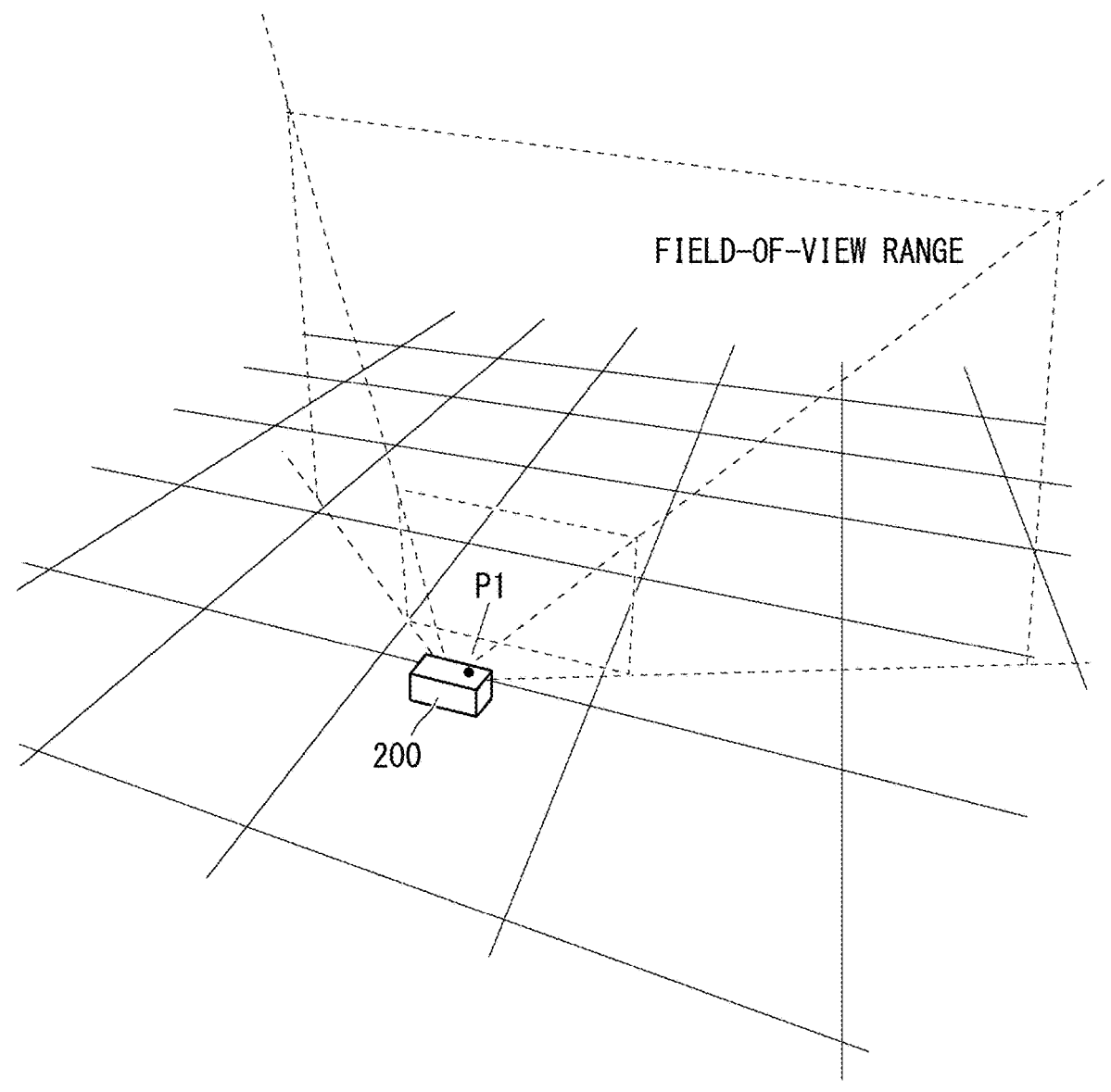
FIG. 3 is a diagram for explaining a field-of-view range of the first camera provided in the mobile system according to the first embodiment.

FIG. 3 is a diagram for explaining a field-of-view range of the camera 200. As shown in FIG. 3, the camera 200 is configured to capture (scan) a quadrangular pyramid-shaped field-of-view range having a viewpoint P1 of the camera as the apex. In the examples of FIGS. 2 and 3, the center of the depth sensors 200$b$ and 200$c$ of the camera 200 is defined as the viewpoint P1. Similarly, in the camera 300, the center of the two depth sensors installed in the camera 300 is defined as a viewpoint P2.

The camera 200 is installed in an area (a first predetermined area) at the upper side (the z-axis positive side) and one of the front side (the x-axis positive side) and the rear side (the x-axis negative side) of the side surface area of the housing 101 of the mobile robot 100. Further, the camera 200 is installed so as to face downward from the position where the camera 200 is installed so that one of side surfaces of the quadrangular pyramid-shaped field-of-view range having the viewpoint P1 as the apex substantially comes into contact with the side surface of the housing 101 of the mobile robot 100.

Figure 4:
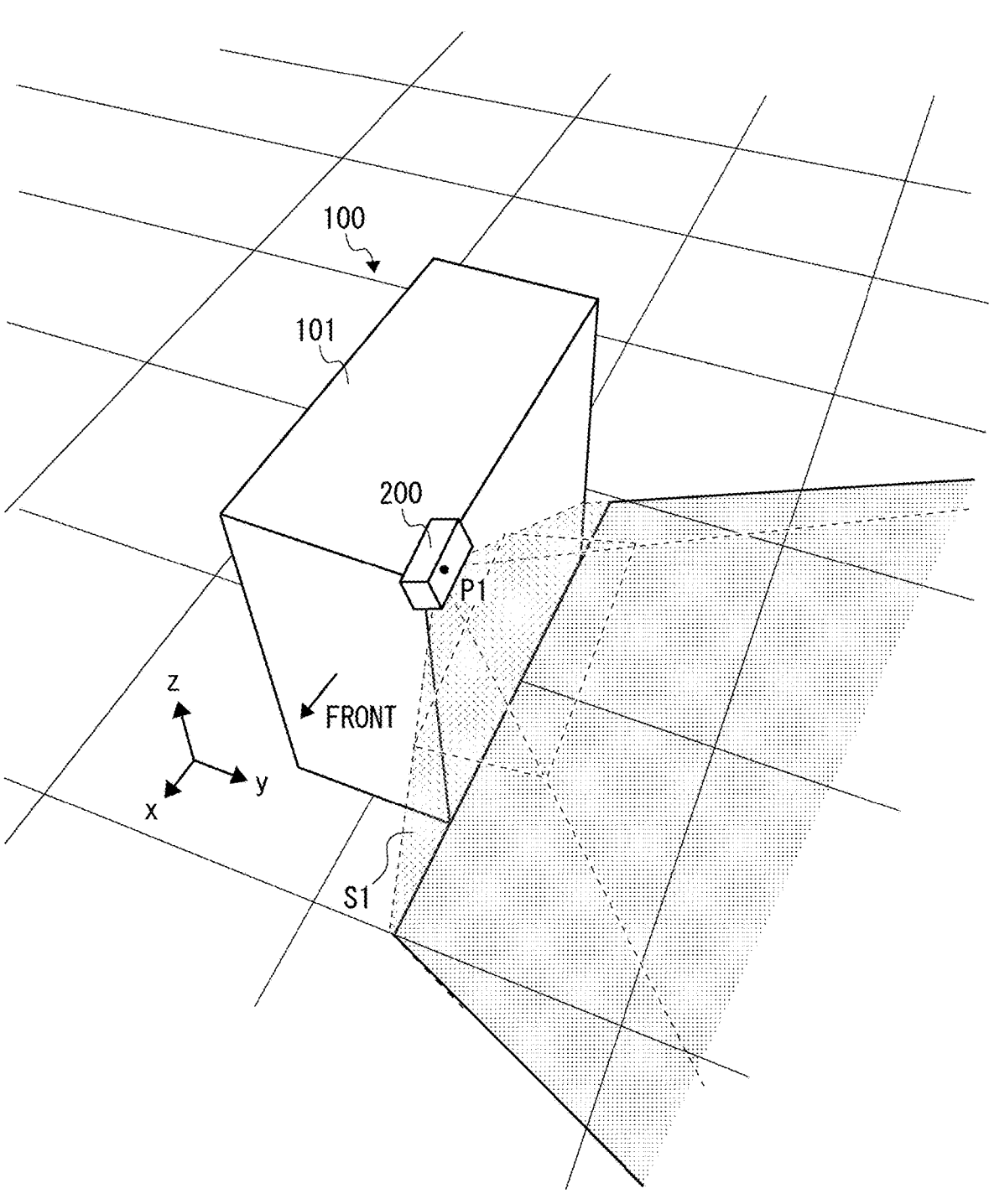
FIG. 4 is a perspective view of a mobile robot and the first camera provided in the mobile system according to the first embodiment.

FIG. 4 is a perspective view of the mobile robot 100 and the camera 200. Note that the camera 300 is not shown in FIG. 4 to make the drawing easier to understand. In the example of FIG. 4, the camera 200 is installed in an area at the upper corner and the front corner of the side surface area of the housing 101 of the mobile robot 100. Further, the camera 200 is installed so as to face downward from the position where the camera 200 is installed so that one side surface S1 of the quadrangular pyramid-shaped field-of-view range having the viewpoint P1 as the apex substantially comes into contact with the side surface of the housing 101 of the mobile robot 100. By doing so, the camera 200 can mainly capture images of an area near the lower side (a floor surface etc.) of the mobile robot 100, including the vicinity of the side surface of the housing 101 of the mobile robot 100.

Note that the camera 200 is preferably installed so that the longitudinal direction thereof is parallel to the side surface of the housing 101 of the mobile robot 100. By doing so, the longitudinal direction of the camera 200 can be prevented from protruding from the housing of the mobile robot 100.

Note that when coordinates of an arbitrary position are $(z',x')$ and coordinates where the viewpoint P1 of the camera 200 is located are $(z\_u,x\_u)$ in the side surface area of the housing 101 of the mobile robot 100 included in the zx plane, it is preferable that the camera 200 be installed so as to satisfy a condition (hereinafter referred to as a conditional expression (1)) that there are no coordinates $(z',x')$ that satisfy $z'>z\_u$ and $x'>x\_u$. By doing so, the camera 200 can capture images of a wider area near the mobile robot 100.

The camera 300 is installed in an area (a second predetermined area) at the lower side (the z-axis negative side) and the other of the front side and the rear side of the side surface area of the housing 101 of the mobile robot 100. Further, the camera 300 is installed so as to face upward from the position where the camera 300 is installed so that one of side surfaces of the quadrangular pyramid-shaped field-of-view range having the viewpoint P2 as the apex substantially comes into contact with the side surface of the housing 101 of the mobile robot 100.

Figure 5:
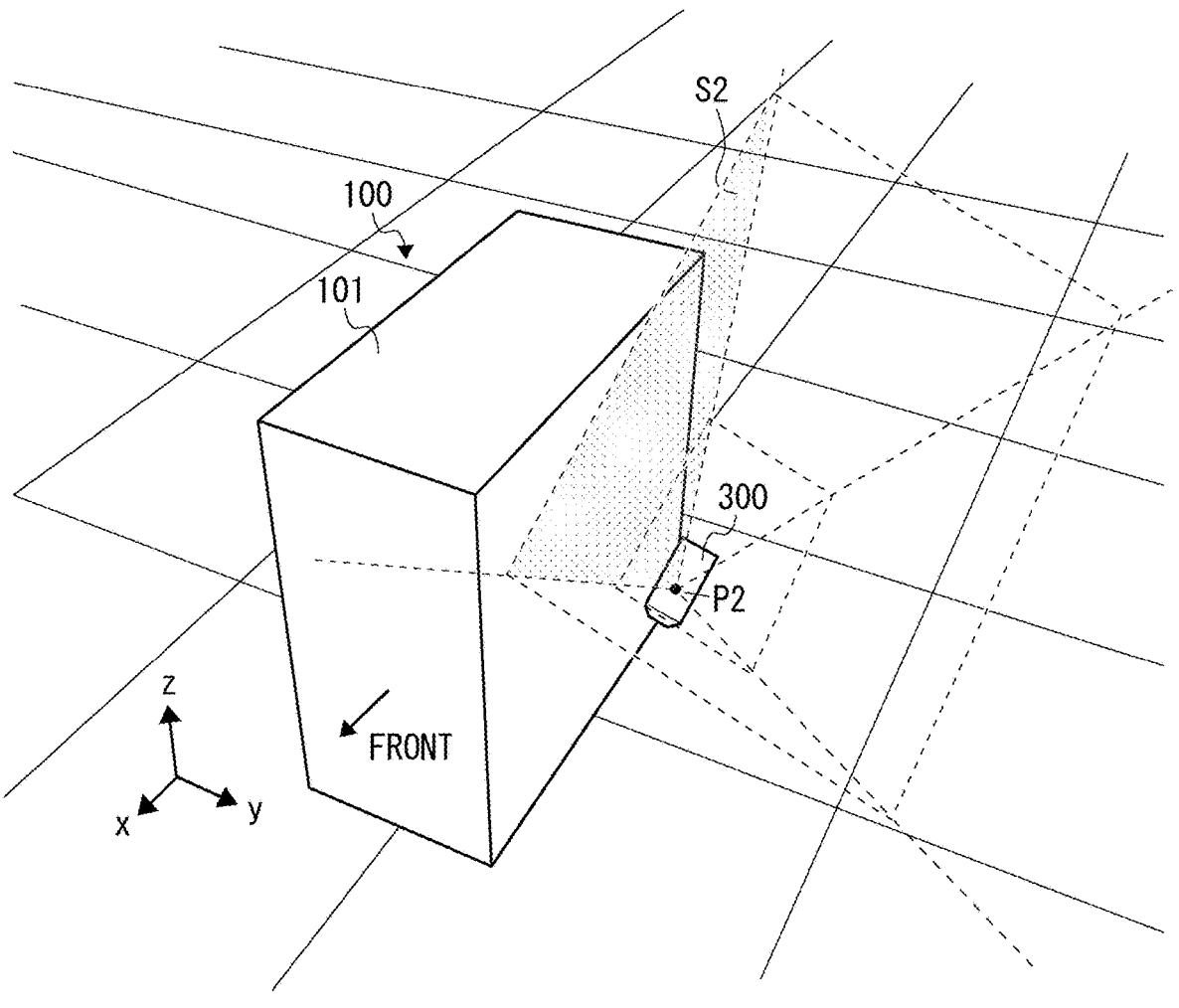
FIG. 5 is a perspective view of the mobile robot and a second camera provided in the mobile system according to the first embodiment.

FIG. 5 is a perspective view of the mobile robot 100 and the camera 300. Note that the camera 200 is not shown in FIG. 5 to make the drawing easier to understand. In the example of FIG. 5, the camera 300 is installed in an area at the lower corner and the rear corner of the side surface area of the housing 101 of the mobile robot 100. Further, the camera 300 is installed so as to face upward from the position where the camera 300 is installed so that one side surface S2 of the quadrangular pyramid-shaped field-of-view range having the viewpoint P2 as the apex substantially comes into contact with the side surface of the housing 101 of the mobile robot 100. By doing so, the camera 300 can mainly capture images of an area near the upper side of the mobile robot 100, including the vicinity of the side surface of the housing 101 of the mobile robot 100.

Note that the camera 300 is preferably installed so that the longitudinal direction thereof is parallel to the side surface of the housing 101 of the mobile robot 100. By doing so, the longitudinal direction of the camera 300 can be prevented from protruding from the housing of the mobile robot 100.

Note that when coordinates of an arbitrary position are $(z',x')$ and coordinates where the viewpoint P2 of the camera 300 is located are $(z\_d,x\_d)$ in the side surface area of the housing 101 of the mobile robot 100 included in the zx plane, it is preferable that the camera 300 be installed so as to satisfy a condition (hereinafter referred to as a conditional expression (2)) that there are no coordinates $(z',x')$ that satisfy $z'<z\_d$ and $x'<x\_d$. By doing so, the camera 300 can capture images of a wider area near the mobile robot 100.

The mobile system according to this embodiment can efficiently capture images of an area near the mobile robot 100 by using the camera 200 in combination with the camera 300.

Figure 6:
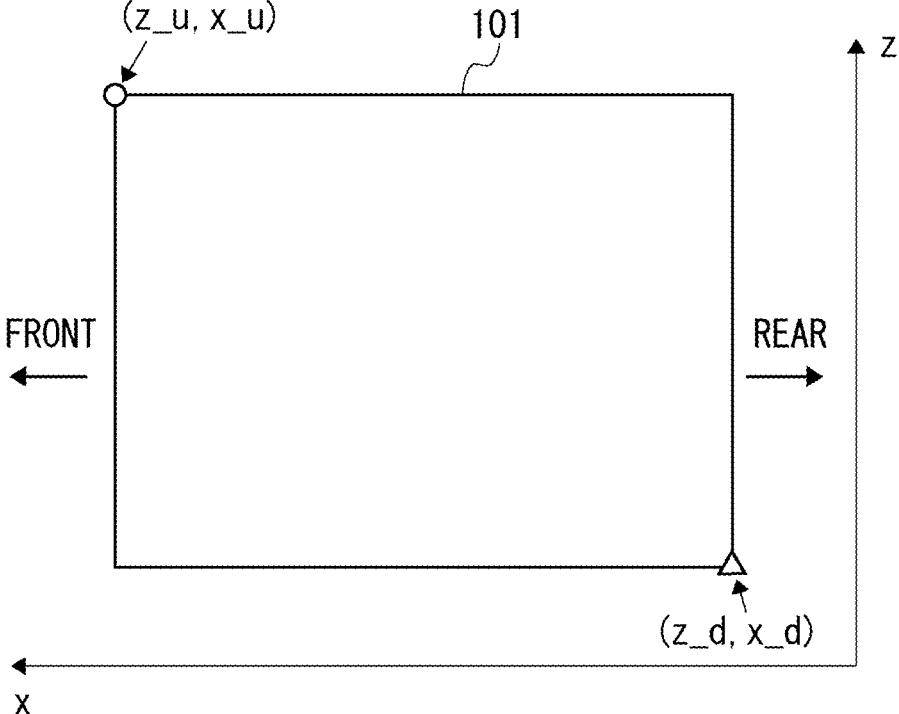
FIG. 6 is a diagram for explaining a method for determining positions where the first camera and the second camera are installed in the mobile robot provided in the mobile system according to the first embodiment.

FIG. 6 is a diagram for explaining a method for determining positions where the cameras 200 and 300 are installed. As shown in FIG. 6, when the housing 101 of the mobile robot 100 has a rectangular parallelepiped shape and the viewpoint P1 of the camera 200 is located in an area (a circle mark in the figure) at the upper corner and the front corner of the side surface area of the housing 101, the conditional expression (1) is satisfied. Therefore, when the housing 101 has a rectangular parallelepiped shape, the camera 200 is preferably installed in an area of the side surface of the housing 101 in which the viewpoint P1 is located at the circle mark shown in FIG. 6.

Further, as shown in FIG. 6, when the housing 101 of the mobile robot 100 has a rectangular parallelepiped shape and the viewpoint P2 of the camera 300 is located in an area (a triangular mark in the figure) at the lower corner and the rear corner of the side surface area of the housing 101, the conditional expression (2) is satisfied. Therefore, when the housing 101 has a rectangular parallelepiped shape, the camera 300 is preferably installed in an area of the side surface of the housing 101 in which the viewpoint P2 is located at the triangular mark shown in FIG. 6.

First Modified Example of the Mobile Robot 100

Figure 7:
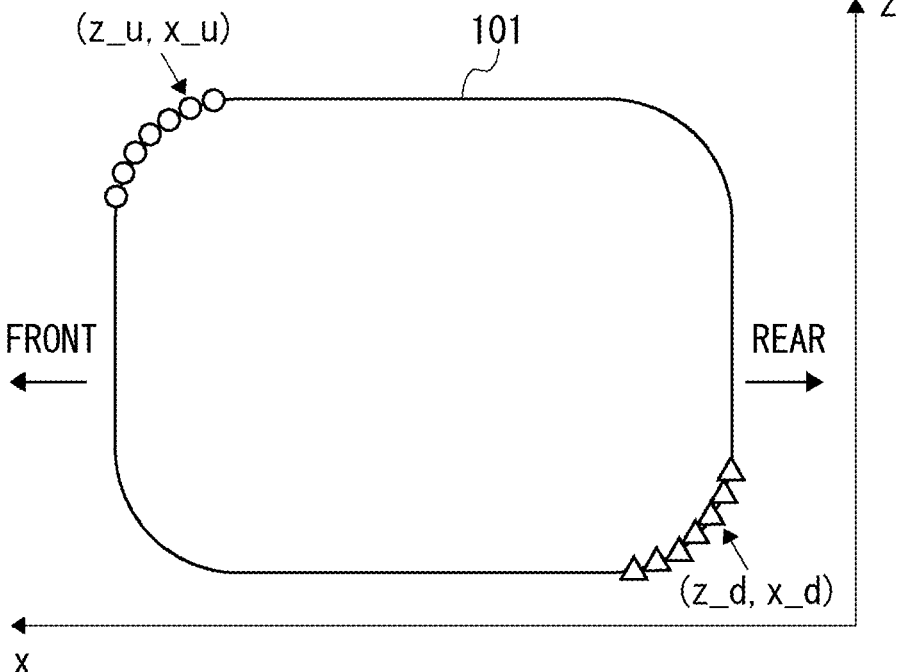
FIG. 7 is a diagram for explaining a first modified example of the mobile robot provided in the mobile system according to the first embodiment, and a method for determining positions where the first camera and the second camera are installed.

FIG. 7 is a diagram for explaining a first modified example of the mobile robot 100 and a method for determining positions where the cameras 200 and 300 are installed. In the example of FIG. 7, the corners of the housing 101 of the mobile robot 100 are rounded. In this case, when the viewpoint P1 of the camera 200 is located in an arbitrary area (a plurality of circle marks in the figure) at the upper corner and the front corner of the side surface area of the housing 101, the conditional expression (1) is satisfied. Therefore, when the corners of the housing 101 are rounded, the camera 200 is preferably installed in an area of the side surface area of the housing 101 in which the viewpoint P1 is located at the circle mark in FIG. 7.

Further, as shown in FIG. 7, when the corners of the housing 101 of the mobile robot 100 are rounded and the viewpoint P2 of the camera 300 is located in an arbitrary area (a plurality of triangular marks in the figure) at the lower corner and the rear corner of the side surface area of the housing 101, the conditional expression (2) is satisfied. Therefore, when the corners of the housing 101 are rounded, the camera 300 is preferably located in an area of the side surface area of the housing 101 in which the viewpoint P2 is located at the triangular mark in FIG. 7.

Second Modified Example of the Mobile Robot 100

Figure 8:
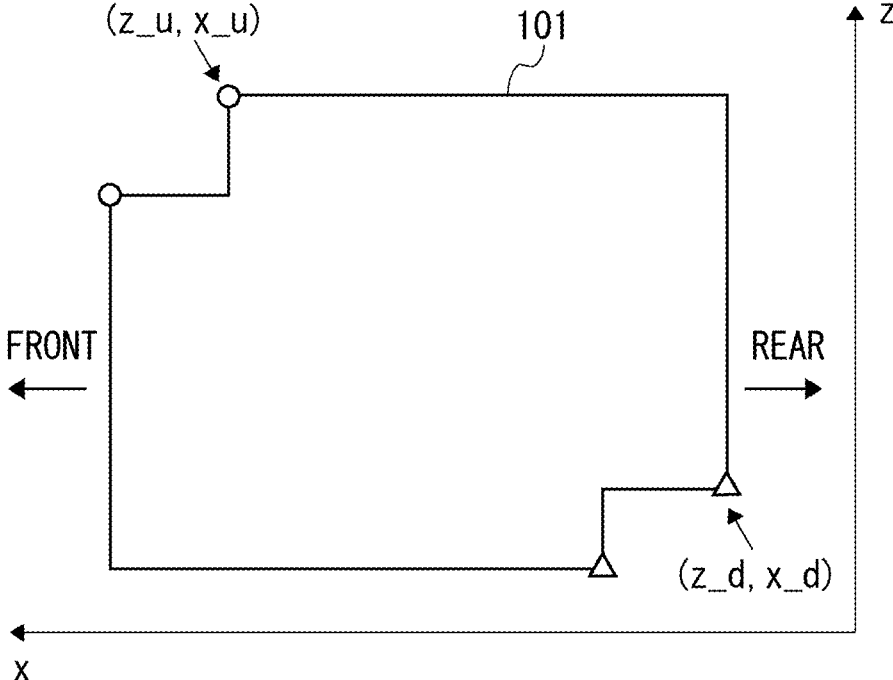
FIG. 8 is a diagram for explaining a second modified example of the mobile robot provided in the mobile system according to the first embodiment, and a method for determining positions where the first camera and the second camera are installed.

FIG. 8 is a diagram for explaining a second modified example of the mobile robot 100 and a method for determining positions where the cameras 200 and 300 are installed. In the example of FIG. 8, the housing 101 of the mobile robot 100 has an uneven shape. In this case, when the viewpoint P1 of the camera 200 is located in an area at one of a plurality of upper corners and front corners (a plurality of circle marks in the figure) of the side surface of the housing 101, the conditional expression (1) is satisfied. Therefore, when the housing 101 has an uneven shape, the camera 200 is preferably installed in an area of the side surface area of the housing 101 in which the viewpoint P1 is located at the circle mark in FIG. 8.

Further, as shown in FIG. 8, when the housing 101 of the mobile robot 100 has an uneven shape and the viewpoint P2 of the camera 300 is located in an area at one of a plurality of lower corners and rear corners (a plurality of triangular marks in the figure) of the side surface of the housing 101, the conditional expression (2) is satisfied. Therefore, when the housing 101 has an uneven shape, the camera 300 is preferably installed in an area of the side surface area of the housing 101 in which the viewpoint P2 is located at the triangular mark in FIG. 8.

As described above, the mobile system according to this embodiment can efficiently capture images of an area near the mobile robot 100 by using the camera 200 in combination with the camera 300. That is, by arranging positions where the cameras 200 and 300 are attached to the mobile robot 100 in a particular manner, the mobile system according to this embodiment can efficiently observe an environment in the vicinity of the mobile robot 100 by using a small number of cameras. As a result, for example, it is possible to detect an obstacle at a position that is likely to be a blind spot near the side surface of the housing 101 of the mobile robot 100.

In this embodiment, a description has been given of an example of a case in which the camera 200 is installed in an area at the upper corner and the front corner of the side surface area of the housing 101 of the mobile robot 100 and the camera 300 is installed in an area at the lower corner and the rear corner of the side surface area of the housing 101 of the mobile robot 100. However, the present disclosure is not limited thereto. For example, the camera 200 may be installed in an upper and rear area of the side surface area of the housing 101 of the mobile robot 100, and the camera 300 may be installed in a lower and front area of the side surface area of the housing 101 of the mobile robot 100.

In this case, when coordinates of an arbitrary position in the side surface area of the housing 101 of the mobile robot 100 included in the zx plane are set to $(z',x')$ and coordinates where the viewpoint P1 of the camera 200 is located are set to $(z\_u,x\_u)$, the camera 200 is preferably installed so as to satisfy a condition that there are no coordinates $(z',x')$ that satisfy $z'>z\_u$ and $x'<x\_u$. Further, the camera 300 is preferably installed so as to satisfy a condition that there are no coordinates $(z',x')$ that satisfy $z'<z\_d$ and $x'>x\_d$. By doing so, the cameras 200 and 300 can capture images of a wider area near the mobile robot 100.

Note that the present disclosure is not limited to the above-described embodiment and may be changed as appropriate without departing from the scope of the present disclosure.

Further, in the present disclosure, it is possible to implement all or part of processing performed by the mobile system by causing a Central Processing Unit (CPU) to execute a computer program.

The above-described program includes instructions (or software codes) that, when loaded into a computer, cause the computer to perform one or more of the functions described in the embodiments. The program may be stored in a non-transitory computer readable medium or a tangible storage medium. By way of example, and not a limitation, non-transitory computer readable media or tangible storage media can include a Random-Access Memory (RAM), a Read-Only Memory (ROM), a flash memory, a Solid-State Drive (SSD) or other types of memory technologies, a CD-ROM, a Digital Versatile Disc (DVD), a Blu-ray (Registered Trademark) disc or other types of optical disc storage, and magnetic cassettes, magnetic tape, magnetic disk storage or other types of magnetic storage devices. The program may be transmitted on a transitory computer readable medium or a communication medium. By way of example, and not a limitation, transitory computer readable media or communication media can include electrical, optical, acoustical, or other forms of propagated signals.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A mobile system comprising:
   a mobile robot;
   a first camera installed in a first predetermined area, the first predetermined area being an area at an upper side and one of a front side and a rear side of a side surface area of a housing of the mobile robot; and
   a second camera installed in a second predetermined area, the second predetermined area being an area at a lower side and the other of the front side and the rear side of the side surface area of the housing of the mobile robot, wherein
   the first camera is installed so as to face downward from the first predetermined area so that one of side surfaces of a quadrangular pyramid-shaped field-of-view range having a viewpoint of the first camera as an apex substantially comes into contact with the side surface of the housing of the mobile robot, and
   the second camera is installed so as to face upward from the second predetermined area so that one of side surfaces of a quadrangular pyramid-shaped field-of-view range having a viewpoint of the second camera as an apex substantially comes into contact with the side surface of the housing of the mobile robot.

2. The mobile system according to claim 1, wherein
   the housing of the mobile robot has a rectangular parallelepiped shape,
   the first predetermined area is an area at an upper corner and one of a front corner and a rear corner of the side surface area of the housing of the mobile robot, and
   the second predetermined area is an area at a lower corner and the other of the front corner and the rear corner of the side surface area of the housing of the mobile robot.

3. The mobile system according to claim 1, wherein
   the housing of the mobile robot has a rectangular parallelepiped shape in which the corners thereof are rounded,
   the first predetermined area is an area at an upper corner and one of a front corner and a rear corner of the side surface area of the housing of the mobile robot, and
   the second predetermined area is an area at a lower corner and the other of the front corner and the rear corner of the side surface area of the housing of the mobile robot.

4. The mobile system according to claim 1, wherein
   the first predetermined area is an area at an upper side and a front side of the side surface area of the housing of the mobile robot,
   the second predetermined area is an area at a lower side and a rear side of the side surface area of the housing of the mobile robot, and
   when, in the side surface area of the housing of the mobile robot included in a zx plane where a vertically upward direction is a positive direction of a z axis, and a front of the mobile robot is a positive direction of an x axis, coordinates of an arbitrary position are set to $(z',x')$, coordinates where a viewpoint of the first camera is located are set to $(z\_u,x\_u)$, and coordinates where a viewpoint of the second camera is located are set to $(z\_d,x\_d)$,
   the first camera is installed so as to satisfy a condition that there are no coordinates $(z',x')$ that satisfy $z'>z\_u$ and $x'>x\_u$, and the second camera is installed so as to satisfy a condition that there are no coordinates $(z',x')$ that satisfy $z'<z\_d$ and $x'<x\_d$.

5. The mobile system according to claim 1, wherein the first predetermined area is an area at an upper side and a rear side of the side surface area of the housing of the mobile robot, the second predetermined area is an area at a lower side and a front side of the side surface area of the housing of the mobile robot, and when, in the side surface area of the housing of the mobile robot included in a zx plane where a vertically upward direction is a positive direction of a z axis, and a front of the mobile robot is a positive direction of an x axis, coordinates of an arbitrary position are set to $(z',x')$, coordinates where a viewpoint of the first camera is located are set to $(z\_u,x\_u)$, and coordinates where a viewpoint of the second camera is located are set to $(z\_d,x\_d)$, the first camera is installed so as to satisfy a condition that there are no coordinates $(z',x')$ that satisfy $z'>z\_u$ and $x'<x\_u$, and the second camera is installed so as to satisfy a condition that there are no coordinates $(z',x')$ that satisfy $z'<z\_d$ and $x'>x\_d$.

6. The mobile system according to claim 1, wherein the first camera has a shape in which it is extended in a left-right direction, and is installed so that a longitudinal direction thereof is parallel to the side surface of the housing of the mobile robot, and the second camera has a shape in which it is extended in the left-right direction, and is installed so that a longitudinal direction thereof is parallel to the side surface of the housing of the mobile robot.

7. The mobile system according to claim 1, wherein both the first camera and the second camera are depth cameras.

* * * * *